March 19, 1957  A. C. MOOS  2,785,718
POTATO MASHER AND BEATER
Filed July 21, 1954
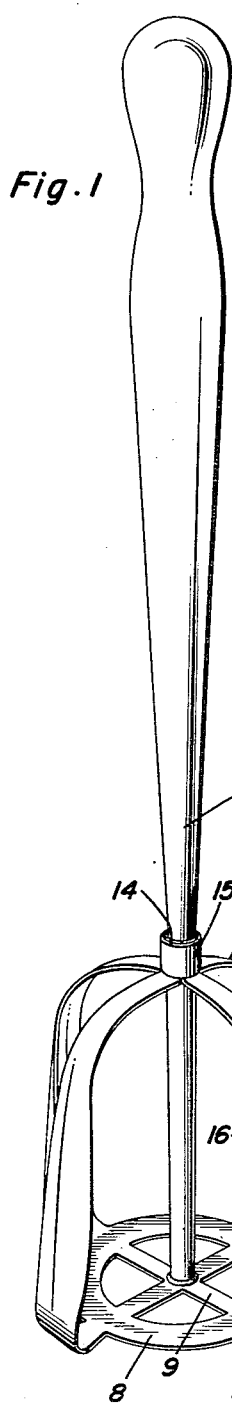
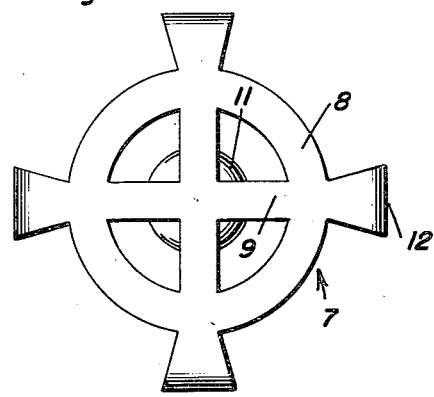
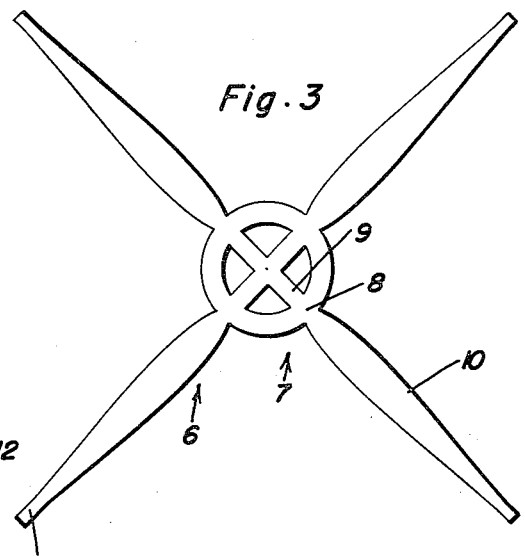
Amanda C. Moos
INVENTOR.
BY
Attorneys

United States Patent Office 2,785,718
Patented Mar. 19, 1957

2,785,718

POTATO MASHER AND BEATER

Amanda C. Moos, Chicago, Ill.

Application July 21, 1954, Serial No. 444,801

2 Claims. (Cl. 146—213)

The present invention relates to new and useful improvements in combined potato mashers and beaters to enable the accomplishment of both operations by a single implement.

An important object of the invention is to provide a culinary implement having a handle provided at its front end with a head portion of novel construction to include a flat reticulated mashing base of circular shape and a plurality of substantially broad beater blades integrally formed with the base and positioned substantially parallel to the handle and each having a free end portion connected to the handle.

Another object is to provide a combined potato masher and beater of simple and practical construction, which is efficient in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a bottom plan view; and

Figure 3 is a plan view of the blank which forms the head of the implement.

Referring now to the drawing in detail, wherein for the purpose of illustration I have disclosed a preferred embodiment of my invention, the numeral 5 designates the head of the implement generally and which is of cage-like formation and may be constructed of plastic, metal or other suitable material and preferably molded or stamped from sheet material to form a blank 6 of a shape as shown in Figure 3.

The blank includes a central base portion 7 which includes a ring 8 formed with a spider 9 and from the periphery of the ring a plurality of substantially broad arms 10 project radially.

A handle 11 has its front end suitably secured to the central portion of spider 9 and the arms 10 are bent in a direction toward the rear end of the handle to form beater blades 12 positioned substantially parallel to the handle and having their rear end portions 13 curved inwardly toward the handle and formed with tongues 14 at the rear extremities of the blades inserted internally of a collar or ferrule 15 which is slidably mounted on the handle to rigidly secure the blades thereto.

The blades are slightly concaved at their inner surfaces to provide non-scratching longitudinal edges 16.

The flat circular base 7 of the head 5 of the implement is used for mashing potatoes or other vegetables while the blades 12 are used to beat or whip the mashed potatoes.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A combined potato masher and beater comprising a handle, and a head of cage-like construction secured to the handle and including a flat annular base having a spider therein and to the center of which the handle is attached, a plurality of blades integrally formed with the base at the periphery of the latter and extending in a direction substantially parallel with respect to the handle, a tongue at the rear end of each blade, and a ferrule on the handle and in which the tongues are inserted to secure the tongues to the handle.

2. A combined potato masher and beater comprising a handle, and a head secured to the lower end of the handle and constructed from a sheet metal blank of bendable material, said blank including a central reticulated annular portion forming a base for the head, said handle being connected at its lower end to the center of said base, a plurality of substantially broad blades projecting radially from the base of the head and said blades extending in an upward direction from the base, tongues at the upper ends of the blades and projecting angularly with respect to the blades and a ferrule on the handle and embracing the tongues to rigidly connect the blades to an intermediate portion of the handle.

References Cited in the file of this patent

UNITED STATES PATENTS

| | | |
|---|---|---|
| 73,743 | Monroe | Jan. 28, 1868 |
| 1,856,954 | Hayward | May 3, 1932 |
| 2,575,978 | Scheidecker | Nov. 20, 1951 |
| 2,659,403 | Jones | Nov. 17, 1953 |